US012560737B2

(12) United States Patent
Bucklew et al.

(10) Patent No.: US 12,560,737 B2
(45) Date of Patent: Feb. 24, 2026

(54) OUTER SPACE-BASED DEBRIS DETECTION SYSTEM AND ASSOCIATED METHODS

(71) Applicant: Eagle Technology, LLC, Melbourne, FL (US)

(72) Inventors: Victor G. Bucklew, Richmond, VA (US); Joseph Dodd, Palm Bay, FL (US); Donna M. Kocak, Satellite Beach, FL (US); James Drakes, Occoquan, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 448 days.

(21) Appl. No.: 18/180,385

(22) Filed: Mar. 8, 2023

(65) Prior Publication Data
US 2024/0302562 A1 Sep. 12, 2024

(51) Int. Cl.
*G01V 9/00* (2006.01)
(52) U.S. Cl.
CPC ...................................... *G01V 9/00* (2013.01)
(58) Field of Classification Search
CPC .......................................................... G01V 9/00
See application file for complete search history.

(56) References Cited

U.S. PATENT DOCUMENTS 5,153,407 A 10/1992 Schall
2019/0329914 A1* 10/2019 Dargin, III ............. B64G 1/242

2021/0011148 A1 1/2021 Blondel et al.
2022/0127018 A1 4/2022 Fukushima et al.
2024/0204864 A1* 6/2024 Voss ................... H04B 7/18513
2025/0102702 A1* 3/2025 Spencer ................. G01W 1/10

FOREIGN PATENT DOCUMENTS

WO 2021149553 7/2021

OTHER PUBLICATIONS

Truitt et al. "Three-dimensional Kadomtsev-Petviashvili damped forced ion acoustic solitary waves from orbital debris" Journal of Spacecraft and Rockets, 2021 58(3), 848-855. Abstract Only.
Truitt, A. S. "Characteristics of Plasma Solitons Produced by Small Orbital Debris" (Doctoral dissertation, University of Maryland, College Park): 2020: pp. 163.
Acharya et al. "Charged space debris induced nonlinear magnetosonic waves using inertial magnetohydrodynamics" Advances in Space Research: 2022 69(11), 4045-4057. Abstract Only.
Li et al., "Soliton collisions in the ion acoustic plasma equations" Journal of Mathematical Fluid Mechanics: 1999; 1(1), 117-130.
(Continued)

*Primary Examiner* — Nicole M Ippolito
(74) *Attorney, Agent, or Firm* — ALLEN, DYER, DOPPELT, GILCHRIST, P.A.

(57) ABSTRACT
An outer space-based debris detection system may include a network of satellites. A first satellite may be configured to propagate a first series of solitary plasma waves through an outer space detection area having a debris body therein. The debris body propagates second plasma waves therefrom. A second satellite associated with the detection area may be configured to receive the first series of solitary plasma waves from the first satellite after interaction with the second plasma waves from the debris body to thereby detect the debris body.

26 Claims, 7 Drawing Sheets

(56)     References Cited

OTHER PUBLICATIONS

Hartzell et al. "NIAC Phase I Final Report: On-Orbit, Collision-Free Mapping of Small Orbital Debris" No. HQ-E-DAA-TN70711.: 2019; pp. 50.

Truitt et al. "Simulating plasma solitons from orbital debris using the forced Korteweglde Vries equation" Journal of Spacecraft and Rockets: 2020; 57(5), Abstract Only.

Sen, A. "Fore-Wake Excitations from Orbiting Space Debris: Signature and Significance for Space Situational Awareness" Institute for Plasma Research: 2022; pp. 79.

Bernhardt et al., "Space object identification by in Situ measurements of orbit driven waves SOIMOW capability briefing", Geophysical Institute, University of Alaska, Oct. 2022, pp. 1-9.

Mukherjee et al., " Exact accelerated solitons by orbiting charged space debris", ARXIV Org., Cornell University Library, Jan. 2020, pp. 1-10.

* cited by examiner

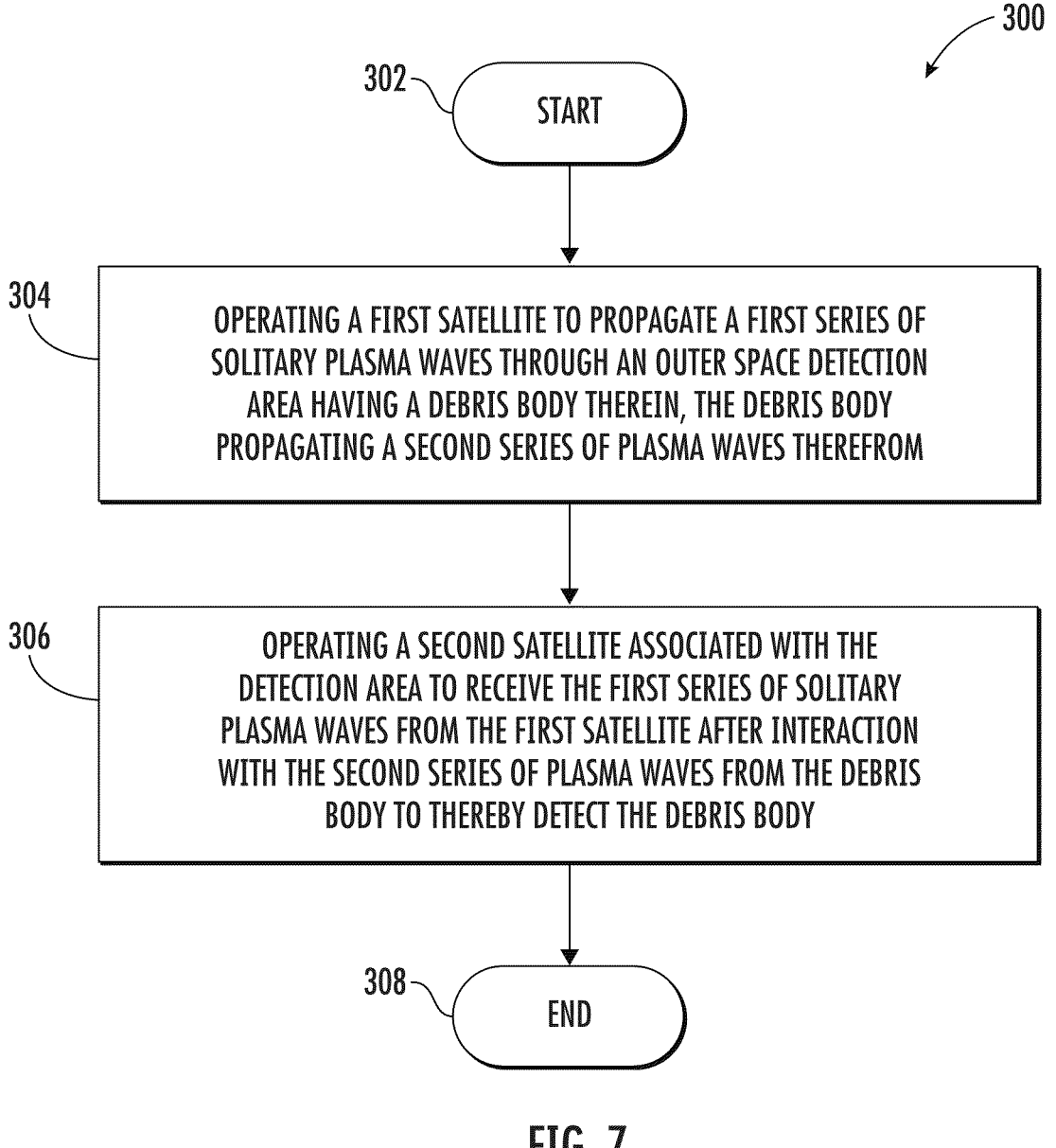

302 — START

304 — OPERATING A FIRST SATELLITE TO PROPAGATE A FIRST SERIES OF SOLITARY PLASMA WAVES THROUGH AN OUTER SPACE DETECTION AREA HAVING A DEBRIS BODY THEREIN, THE DEBRIS BODY PROPAGATING A SECOND SERIES OF PLASMA WAVES THEREFROM

306 — OPERATING A SECOND SATELLITE ASSOCIATED WITH THE DETECTION AREA TO RECEIVE THE FIRST SERIES OF SOLITARY PLASMA WAVES FROM THE FIRST SATELLITE AFTER INTERACTION WITH THE SECOND SERIES OF PLASMA WAVES FROM THE DEBRIS BODY TO THEREBY DETECT THE DEBRIS BODY

308 — END

OUTER SPACE-BASED DEBRIS DETECTION SYSTEM AND ASSOCIATED METHODS

TECHNICAL FIELD

The present disclosure relates to detection systems and, more particularly, to a detection system in outer space for detecting debris.

BACKGROUND

Orbital debris is defined as any human-made space object orbiting Earth that no longer serves any useful purpose. Orbital debris poses a risk to space missions. With an average low Earth orbit (LEO) impact velocity of 22,500 MPH, even the smallest of debris can cause significant damage. This is demonstrated by pits in Space Shuttle windows produced by paint chips impacting the windows.

Currently, there are over 100 million objects greater than 1 mm orbiting the Earth. However, less than 1 percent of debris that can cause mission-ending damage are currently tracked. Due to the dynamic nature of the near-Earth space environment, predicting the trajectory of the debris is extremely difficult, necessitating persistent monitoring.

While debris larger than 10 cm can be detected and tracked, smaller debris cannot be tracked using current capabilities. Debris that is too small to track is often termed lethal non-trackable debris (LNT), and can create significant damage to spacecraft and jeopardize space missions. The detection, tracking, and characterization of non-trackable space debris would support the safe operation of valuable space assets worldwide.

The number of estimated space debris objects greater than 10 cm as a function of time is provided by graph 20 in FIG. 1. Line 22 corresponds to the number of rocket bodies, line 24 corresponds to the number of mission related debris, line 26 corresponds to the number of spacecraft, and line 27 corresponds to the number of fragmentation debris. The annotated increases in line 27 take into account 1) the Chinese ASAT test conducted in 2007, 2) the accidental collision between Iridium 33 and Cosmos 2251 in 2009, and 3) the Russian ASAT test conducted in November 2021. Line 28 corresponds to all of the number of objects in lines 22-27 added together.

Ground based sensors continue to improve their detection capabilities, but ground sensor detection sensitivity rapidly decreases with increasing altitude and is limited to observing high latitudes. The ground sensors in the U.S. Space Surveillance Network (SSN) can detect 10 cm objects at 2,000 km altitude in low Earth orbit (LEO), and 1 m objects at 35,786 km altitude in geosynchronous equatorial orbit (GEO).

Unfortunately, ground-based sensors are not able to track small objects due to the debris' relatively high angular velocity and must remain in staring mode to count the number of objects passing through their small fields of view. The largest source of uncertainty exists in the ability to interpret the signal strength to determine the size or mass of the object passing through the field of view.

Current estimates for small debris are largely based on collisional detections during U.S. space shuttle missions, which have now been retired. These collisional detections were restricted to measuring debris strikes at altitudes below 600 km, the upper limit of space shuttle operations, and were then used to estimate the small debris population at a range of altitudes. Indirect space-based techniques that do not rely on collisions, such as detecting plasma waves emitted from small debris particles, currently are range limited based on the size of debris particle, varying from 1 km to 50 km.

SUMMARY

An outer space-based debris detection system comprises first and second satellites. The first satellite may be configured to propagate a first series of solitary plasma waves through an outer space detection area having a debris body therein. The debris body may be propagating second plasma waves therefrom. The second satellite is associated with the detection area and may be configured to receive the first series of solitary plasma waves from the first satellite after interaction with the second plasma waves from the debris body to thereby detect the debris body.

The first satellite may comprise a voltage generator and a plasma perturbation tip coupled thereto. The first satellite may comprise a plasma perturbation tip.

The second plasma waves may comprise a series of solitary plasma waves. The second satellite may be configured to detect the debris body based on determining a phase shift in the first series of solitary plasma waves after interaction with the second series of solitary plasma waves.

The second plasma waves may comprise plasma perturbations. The second satellite may be configured to detect the debris body based on determining an amplitude change in the first series of solitary plasma waves after interaction with the second plasma perturbations.

The first satellite may comprise an array of plasma perturbation tips. The array of plasma perturbation tips may have different sizes. The second satellite may comprise a Langmuir probe array.

The debris body may comprise one of a pinned soliton debris body, a precursor soliton debris body, and a plasma perturbation debris body.

The first and second satellites may each comprise a communications system configured to use a timing reference to synchronize timing therebetween.

The second satellite may comprise a communications system configured to communicate data on the detected debris body.

Another aspect is directed to an outer space-based debris detection system comprising a first satellite comprising an array of plasma perturbation tips, and a second satellite comprising a Langmuir probe array. The array of plasma perturbation tips in the first satellite may be configured to propagate respective first series of solitary plasma waves through an outer space detection area having a debris body therein. The debris body may propagate second plasma waves therefrom. The Langmuir probe array in the second satellite may be configured to receive the respective first series of solitary plasma waves from the first satellite after interaction with the second plasma waves from the debris body to thereby detect the debris body.

Yet another aspect is directed to a method for detecting debris in outer space using the outer space-based debris detection system as described above.

BRIEF DESCRIPTION OF THE DRAWINGS

FIG. 7 is a flowchart illustrating a method for operating the debris detection system illustrated in FIG. 2.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
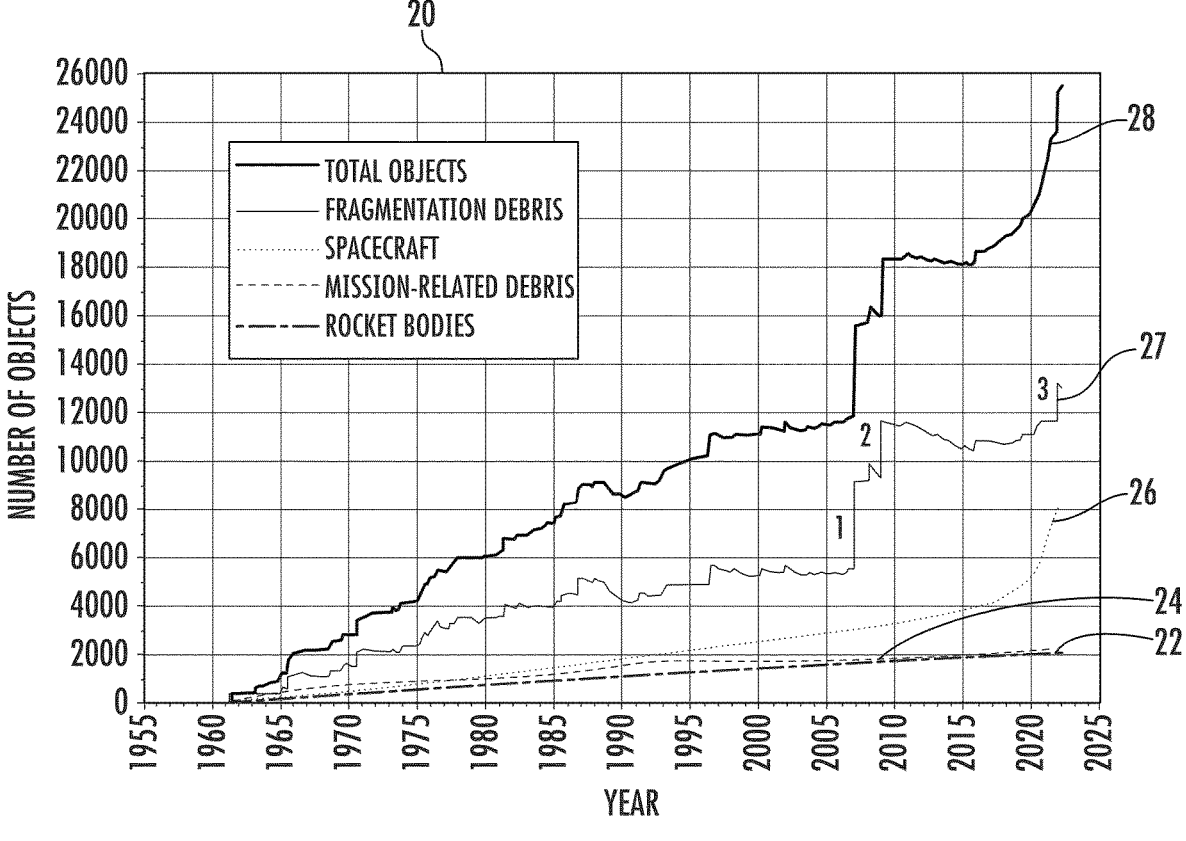
FIG. 1 is a graph estimating the number of space debris objects greater than 10 cm as a function of time in accordance with the prior art.
Figure 2:
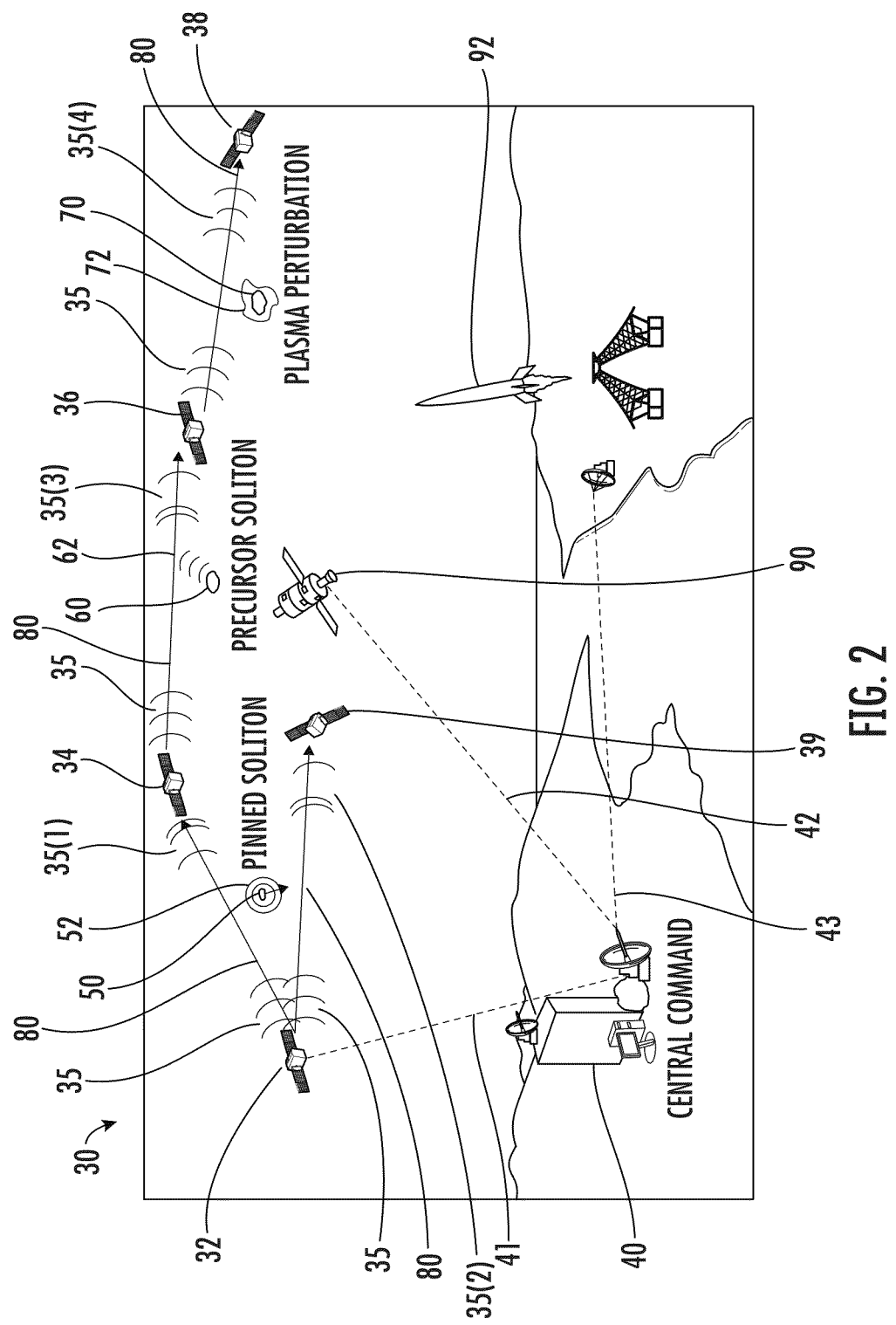
FIG. 2 is a schematic diagram of a low Earth orbit (LEO) debris detection system in which various aspects of the disclosure may be implemented.

Referring initially to FIG. 2, a space-based debris detection system 30 includes a network of LEO satellites 32-38 in communications with a central command 40. The satellites 32-38 are configured to use plasma wave detection, called PLADAR (plasma detection and ranging) to detect the presence of space debris.

Debris orbiting the Earth within the ionosphere propagates plasma waves based on interaction of the debris with the ionospheric plasma. For example, debris 50, 60 propagate plasma density solitary waves, or solitons. A soliton is a self-reinforcing wave packet that maintains its shape while it propagates at a constant velocity. Solitons will propagate without damping in a uniform environment.

The respective solitons generated by debris 50, 60 may be referred to as pinned solitons 52 and precursor solitons 62. Debris 50 propagates pinned solitons 52, which travel with the debris at the same speed. Debris 60 propagates precursor solitons 62, which advance upstream of the debris. Pinned solitons 52 are created when the debris velocity is greater than the ion acoustic velocity in a plasma. Precursor solitons 62 are created when the debris velocity is comparable to the ion acoustic velocity.

Not all debris within the ionosphere will propagate solitons, such as debris 70. This may be due to the debris being at a higher altitude and/or being larger in size. Instead, debris 70 propagates plasma perturbations 72, which does not maintain its shape. Instead, the plasma perturbations 72 are attenuating or damping in a uniform environment as the plasma wave travels.

As will be explained in detail below, debris detection is performed without requiring collision with the debris. A first satellite within the debris detection system 30 includes a plasma perturbation tip to propagate solitons through a detection area, which are received by a second satellite. The solitons may be actively generated or passively generated by the first satellite. The second satellite includes a plasma receiver, such as a Langmuir probe, to receive the solitons.

As the solitons from the first satellite travel through the detection area, they interact or collide with the plasma waves generated by the debris. This interaction or collision is determined by the second satellite, which indicates detection of debris within the detection area.

If the debris is generating solitons, then the detection is based on determining a phase shift in the solitons from the first satellite after interaction with the solitons from the debris. The magnitude of the phase shift may be further used to determine a size of the debris. If the debris is generating plasma perturbations, then the detection is based on determining a change in amplitude in the solitons from the first satellite after interaction with the plasma perturbations from the debris.

As an example, satellite 32 has a plasma perturbation tip to propagate a first series of solitons 35. The first series of solitons 35 are received by satellites 34 and 39. The solitons 35 are evenly spaced due to the periodicity of the solitons. The solitons 35 may be referred to as a train of solitons that propagate through space at regular intervals and amplitudes. The solitons 35 are evenly spaced due to the periodicity of the solitons. In addition, a timing reference 80 may be provided by satellite 32 to satellites 34 and 39. The timing reference 80 establishes and synchronizes timing between satellite 32 and satellites 34, 39.

Debris 50 within a detection area propagates a second series of solitons 52, i.e., pinned solitons. The second series of solitons 52 interact with the first series of solitons 35. This interaction, when received by satellites 34 and 39, causes a phase shift in the first series of solitons 35. After this interaction, the first series of solitons 35 become unevenly spaced due to the phase shift, as indicated by references 35(1) and 35(2). This allows satellites 34 and 39 to detect the debris 50 based on the respective received phase shifts 35(1) and 35(2).

The central command 40 is in communications with satellite 32, as indicated by dashed line 41. Although not shown, the central command 40 is also in communications with satellites 34-39. In the above example, satellites 34 and 39 provide debris detection data to the central command 40 when the debris 50 has been detected. The central command 40 is able to construct a debris field map based on the debris detection data. The central command 40 may use the debris detection data to catalog the debris 50, as well as track a trajectory of the debris 50 since satellites 34 and 39 are providing respective debris detection data.

In response to the trajectory of the debris 50 potentially crossing paths with space assets 90 and 92, the central command 40 may provide commands to the space assets 90 and 92 to optimize mission performance, as indicated by dashed lines 42, 43. Such commands may alter a path of the space assets 90 and 92 to avoid collision with the debris 50.

As another example, satellite 34 has a plasma perturbation tip to propagate its own first series of solitons 35, which are received by satellite 36. In addition, a timing reference 80 may be provided by satellite 34 to satellite 36. Debris 60 within a detection area propagates a second series of solitons 62, i.e., precursor solitons. The second series of solitons 62 interact with the first series of solitons 35. This interaction, when received by satellite 36, causes a phase shift in the first series of solitons 35. After this interaction, the first series of solitons 35 become unevenly spaced due to the phase shift, as indicated by reference 35(3). This allows satellite 36 to detect the debris 60. Satellite 36 provide debris detection data to the central command 40 when the debris 60 has been detected.

As yet another example, satellite 36 has a plasma perturbation tip to propagate its own first series of solitons 35, which are received by satellite 38. In addition, a timing reference 80 may be provided by satellite 36 to satellite 38. Debris 70 within a detection area propagates second plasma waves 72, i.e., plasma perturbations, which are not solitons. The second plasma perturbations 72 interact with the first series of solitons 35. This interaction, when received by satellite 38, causes a change in amplitude (i.e., attenuation or damping) of the first series of solitons 35. After this interaction, the first series of solitons 35 may remain evenly spaced but have been attenuated, as indicated by reference 35(4). This allows satellite 38 to detect the debris 70. Satellite 38 likewise provides debris detection data to the central command 40 when the debris 70 has been detected.

Figure 3:
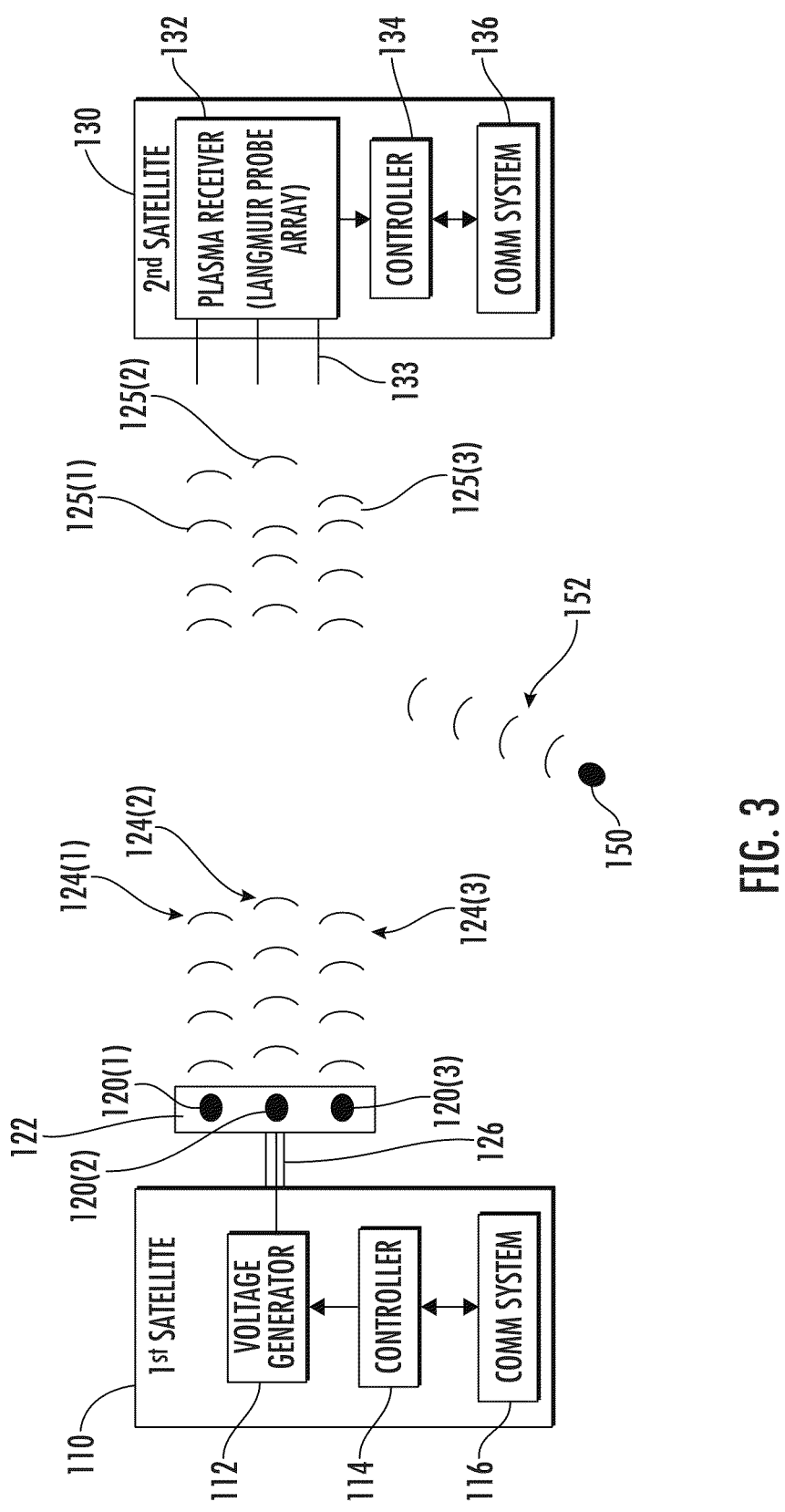
FIG. 3 is a schematic block diagram of a pair of satellites operating in the debris detection system illustrated in FIG. 2.

Referring now to FIG. 3, a pair of satellites 110, 130 operating in the debris detection system 30 will be discussed. Satellites 110, 130 may also be referred to as first and second satellites. In this case, the debris 150 to be detected within a detection area propagates a second series of solitons 152, i.e., pinned solitons or precursor solitons.

The first and second satellites 110, 130 are configured so that the trajectory of the detected debris 150 may be determined by multiple debris detection data collected by the second satellite 130. This is in contrast to the above example, where the central command 40 collectively used both of the individual debris detection data provided by satellites 34 and 39 to track a trajectory of the debris 50.

The first satellite 110 includes an array of plasma perturbation tips 120(1)-120(3), which may be generally referred to as plasma perturbation tips 120. Each plasma perturbation tip 120 is configured to propagate a respective first series of solitons through the outer space detection area having the debris 150 therein. As advantage of the first satellite 110 propagating more than one first series of solitons is that the second satellite is able to provide multiple debris detection data based on the respective interactions of each of the first series of solitons with the second series of solitons 152 from the debris 150. The multiple debris detection data is to be used to determine a trajectory of the debris 150.

Plasma perturbation tip 120(1) propagates a first series of solitons 124(1), plasma perturbation tip 120(2) propagates another first series of solitons 124(2), and plasma perturbation tip 120(3) propagates yet another first series of solitons 124(3). The first series of solitons 124(1)-124(3) may be generally referred to by reference number 124. Even though three plasma perturbation tips 120(1)-120(3) are shown, this is not to be limiting, as one or more plasma perturbation tips may be used.

The plasma perturbation tips 120 are metal and are embedded in an insulating material 122. The size and shape of the plasma perturbation tips 120 may vary. The size of the plasma perturbation tip 120 sets a width of the first series of solitons 124 being propagated from that plasma perturbation tip 120. The solitons may travel further when a smaller width soliton is used, which is an advantage for ranging.

The plasma perturbation tips 120 may be carried by the first satellite 110 using a rigid boom 126. The rigid boom 126 extends away from the first satellite 110, and may be configured out of a composite material that is insulated. As an alternative to the rigid boom 126, the plasma perturbation tips 120 may be coupled to the first satellite 110 using carbon fiber tethers.

As noted above, the first series of solitons may be actively or passively generated. To actively generate the first series of solitons 124, a voltage generator 112 provides an electrical signal to each of the metal plasma perturbation tips 120. To passively generate the first series of solitons 124, interaction of each metal plasma perturbation tip 120 with the ionospheric plasma inherently propagates the first series of solitons 124 without the need for the voltage generator 112.

Even though there is periodicity in the first series of solitons 124 when passively generated, greater control of the solitons is provided when actively generated. When the first series of solitons 124 are actively generated, a forcing function is used. The level of voltage applied by the voltage generator 112 to each metal plasma perturbation tip 120 sets the amplitude of the respective forcing functions.

By varying the amplitude and/or the shape of the forcing function allows different types of solitons 124 to be generated. This allows the second satellite 130 to more accurately detect the debris 150. In addition, the different types of solitons 124 may serve as fingerprints of the debris 150 allowing for differentiation of the interactions of the first series of solitons 124 with the second series of solitons 152 from the debris 150.

The first satellite 110 includes a controller 114 coupled to the voltage generator 112 for control thereof. The controller 114 is also coupled to a communications system 116. The communications system 116 allows for communications with the second satellite 130, as well as with central command 40. The communications may be based on radio frequency (RF) signals or optical signals. Also, the communications system 116 allows a timing resource to be provided to synchronize timing with the second satellite 130.

The second satellite 130 includes a plasma receiver 132 configured to receive the respective first series of solitary plasma waves 124 from the first satellite 110 after interaction with the second series of solitons 152 from the debris 150. The plasma receiver 132 may be a Langmuir probe array.

A Langmuir probe array 132 is a device used to determine the electron temperature, electron density, and electric potential of a plasma. The Langmuir probe array 132 has a plurality of electrodes 133 that are used to receive the respective first series of solitons 124 from the first satellite 110, and after interactions of the respective first series of solitons 124 with the second series of solitons 152 from the debris 150.

The second satellite 130 includes a controller 134 coupled to the plasma receiver 132. The controller 134 includes a processor to analyze interactions of the first series of solitons 124 with the second series of solitons 152 from the debris 150. Detection of the debris 150 is based on determining respective phase shifts in the first series of solitons 124 from the first satellite 110 after interaction with the second series of solitons 152 from the debris 150.

The overall arrival time of each first series of solitons 124 after interaction with the second series of solitons 152 from the debris 150 can be used to determine the location of the debris 150 between the first and second satellites 110, 130. Multiple measurements of the debris 150 with the Langmuir probe array 132 can be used to determine the orbital trajectory of the debris 150.

For example, interactions of the first series of solitons 124(1) with the second series of solitons 152 from the debris 150 causes a phase shift (i.e., a time delay) as indicated by reference 125(1). Instead of the solitons 124(1) being evenly spaced, there is a time delay such that the solitons 124(1) become unevenly spaced. Interactions of the first series of solitons 124(2) with the second series of solitons 152 from the debris 150 causes a phase shift as indicated by reference 125(2). Interactions of the first series of solitons 124(3) with the second series of solitons 152 from the debris 150 causes a phase shift as indicated by reference 125(3).

The controller 134 may provide the multiple debris detection data to the communications system 136 for transmission to the central command 40. The multiple debris detection data is used to advantageously determine the orbital trajectory of the debris 150. The communications system 116 also allows for communications with the first satellite 110. The communications may be based on radio frequency (RF) signals or optical signals. The communications system 116 allows a timing resource to be received to synchronize timing with the first satellite 110.

The first satellite 110 is configured to provide a transmit function, wherein the first series of solitary plasma waves 124 are propagated by the plasma perturbation tips 120. The second satellite 130 is configured to provide a receive function, wherein the plasma receiver 132 receives the respective first series of solitary plasma waves 124 from the first satellite 110 after interaction with the second series of solitons 152 from the debris 150. Although the transmit and receive functions are in separate satellites, transmit and receive functions may be combined into a single satellite. For example, one side of the satellite may provide the transmit function whereas an opposite side of the satellite may provide the receive function. A network of dual function satellites may be used to detect space debris as described above.

Figure 4:
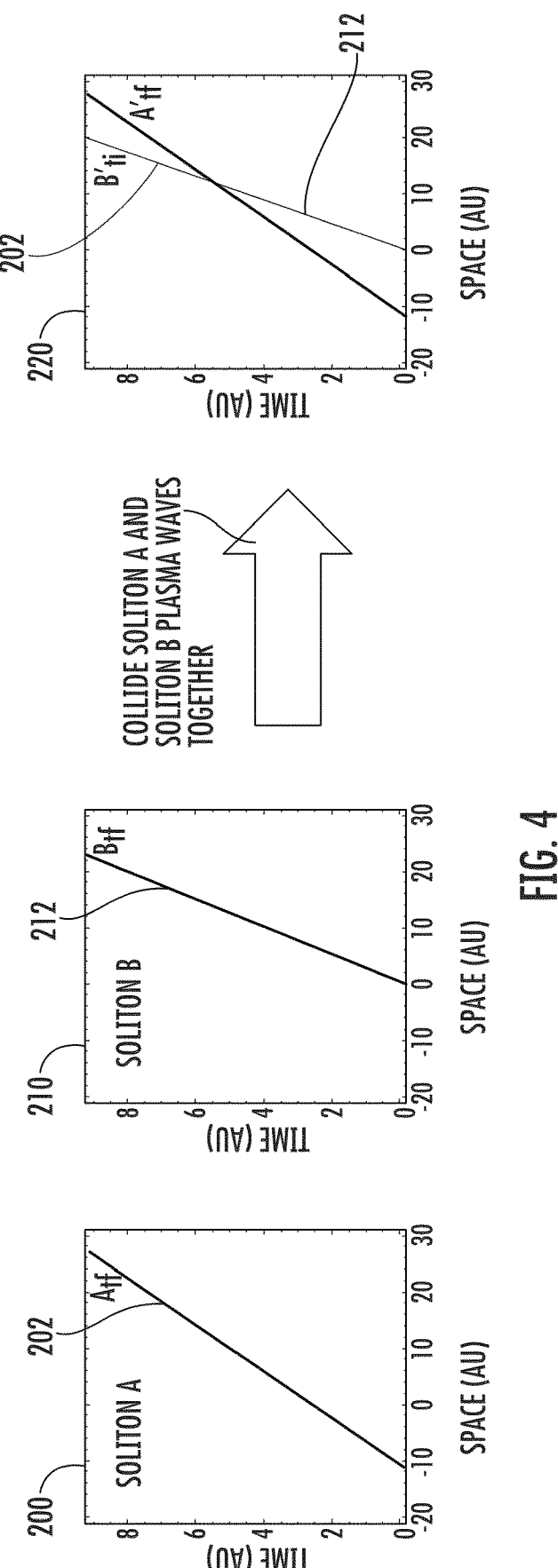
FIG. 4 are images of distinct soliton plasma waves before and after collision.

Referring now to FIG. 4, images of distinct soliton plasma waves before and after collision will be discussed. Image 200 is of soliton A plasma waves 202 advancing in space as time elapses before collision. Soliton A plasma waves 202 are labeled $A_{tf}$. Soliton A plasma waves 202 may be propagated by a satellite. Image 210 is of soliton B plasma waves 212 advancing in space as time elapses before collision. Soliton B plasma waves 212 are labeled $B_{tf}$. Soliton B plasma waves 212 may be propagated by debris.

Image 220 is of soliton A plasma waves 202 after collision with soliton B plasma waves 212. After collision, soliton A plasma waves 202 are labeled A'tf and soliton B plasma waves 212 are labeled B'tf. The collision can result in a scattering effect, similar to a cue ball hitting a pool ball.

Figure 5:
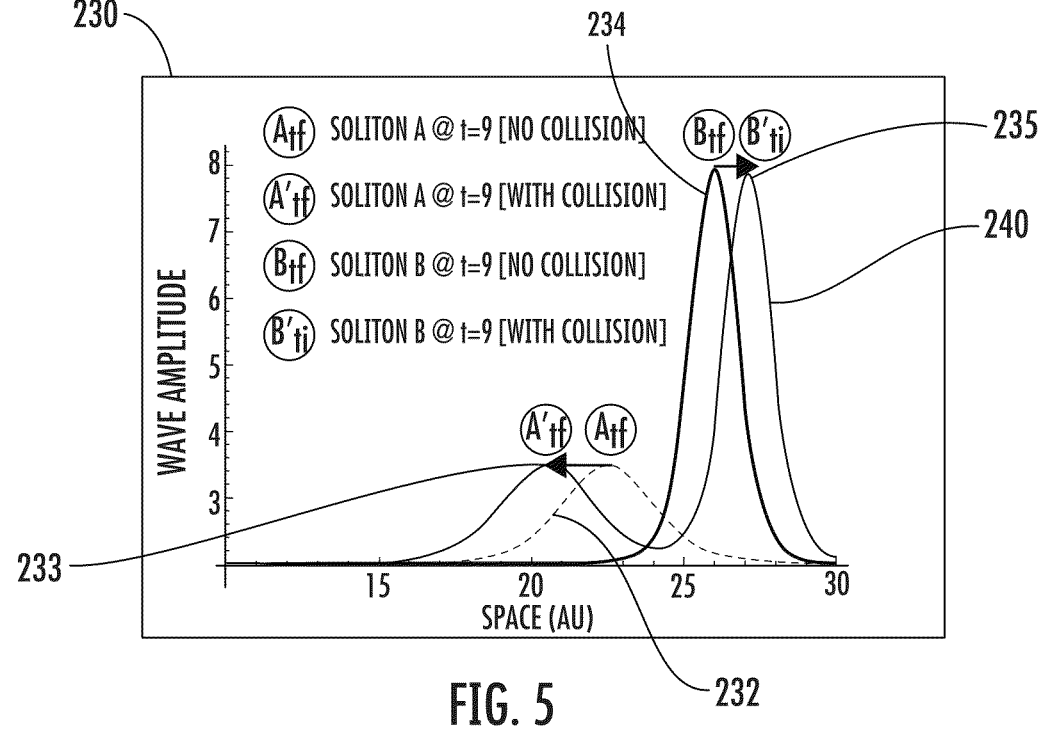
FIG. 5 is a plot showing the soliton plasma waves in FIG. 4 before and after collision.

A plot 230 showing the scattering effect of soliton A plasma waves 202 with soliton B plasma waves 212 at a particular instant in time (i.e., t=9) will be discussed in reference to FIG. 5. The collision produces measurable displacements in time and spaces, which can be correlated with the presence of a specific debris body.

Line 232 corresponds to soliton $A_{tf}$ as a function of wave amplitude versus an arbitrary space unit (AU) before collision. Line 234 corresponds to soliton $B_{tf}$ as a function of wave amplitude versus an arbitrary space unit (AU) before collision.

The collision between soliton $A_{tf}$ and soliton $B_{tf}$ is indicated by line 240. As a result of the collision, soliton A'$_{tf}$ is delayed in space as indicated by arrow 233 and soliton B'$_{tf}$ is advanced in space as indicated by arrow 235. Soliton A'$_{tf}$ is slowed down and soliton B'$_{tf}$ is sped up.

Figure 6:
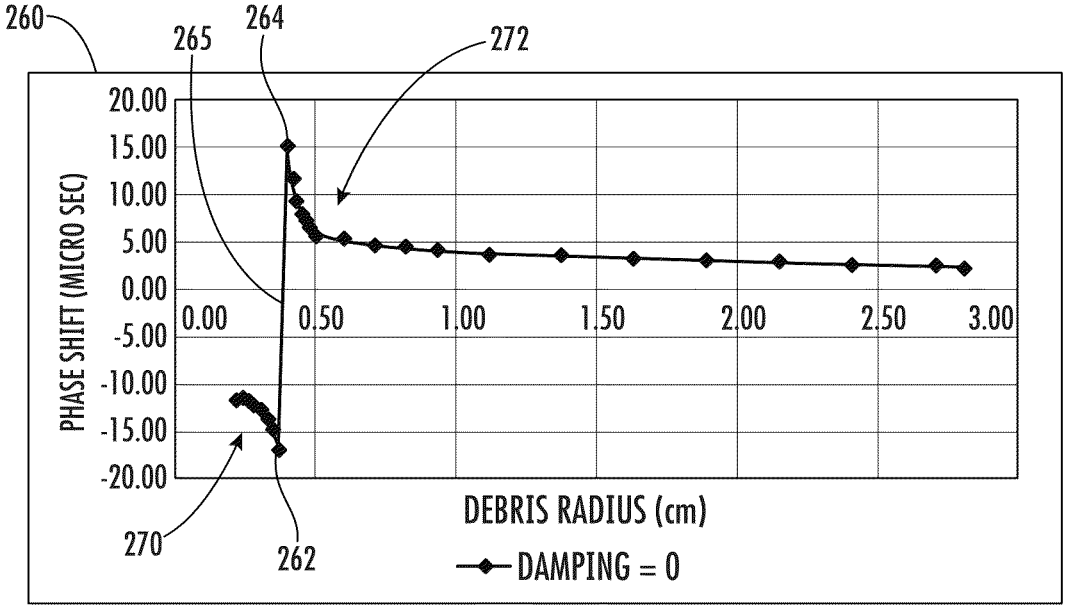
FIG. 6 is a plot correlating phase shift to a radius of the detected debris.

Referring now to FIG. 6, a plot 260 correlating phase shift to a radius of the detected debris will be discussed. In addition to the phase shift being used to detect a debris body, the phase shift may be further used to estimate a size of the debris body.

In this case study, solitons A were purposefully generated with a forcing function of 0.4 cm. The forcing function corresponds a plasma perturbation tip having a size of 0.40 cm to propagate solitons A.

Solitons A propagated by the 0.40 cm plasma perturbation tip were collided with plasma waves (i.e., solitons B) produced by debris bodies of varying size. The temporal difference between the arrival time of soliton A at a plasma receiver without a collision, and the measured arrival time when a collision took place with soliton B, were tabulated as a function of the debris radius.

The nearly vertical line 265 between upper diamond 262 and lower diamond 264 is considered the crossover point when soliton A and soliton B collide. The crossover point is aligned with a debris radius of 0.40 cm. Solitons A and B are considered to have the same properties at the time of collision. If a size of the plasma perturbation tip was changed to 1.00 cm, then the crossover point would be shifted to 1.00 cm.

The phase shift may be negative 270 or positive 272. A negative phase shift 270 starts with lower diamond 262 and angles to the left side of the plot, and a positive phase shift 272 starts with upper diamond 264 and angles to the right side of the plot. The phase shift 270 is negative when the debris radius is less than 0.40 cm, and is positive 272 when the debris radius is greater than 0.40 cm.

The difference in the time of arrival of the solitary wave changes as a function of the debris radius, meaning that not only can collisions with debris be indirectly detected with this method, but that debris sizes can also be categorized!

Referring now to FIG. 7, a flowchart 300 illustrating a method for operating the debris detection system 30 as described above will be discussed. From the start (Block 302), the method includes operating a first satellite 32 at Block 304. The first satellite 32 is operated to propagate a first series of solitary plasma waves 35 through an outer space detection area having a debris body 50 therein. The debris body 50 propagates a second plasma waves 52 therefrom. A second satellite 34 is operated at Block 306. The second satellite 34 is associated with the detection area and is configured to receive the first series of solitary plasma waves 35(1) from the first satellite 32 after interaction with the second plasma waves 52 from the debris body 50 to thereby detect the debris body 50. The method ends at Block 308.

As described above, the debris detection system 30 may be used to assemble debris maps. Another use case of the satellites in the debris detection system 30 is that at least two of the satellites may be configured as low cost satellites used to protect a high value asset, such as a larger more expensive satellite. The low cost satellites travel ahead of the high value asset, and provide actionable intelligence about mission ending or compromising debris threats. In addition to the low cost satellites detecting debris ahead of the high value asset, another use case is for the low cost satellites to detect the presence of hostile satellites or other space objects ahead of the high value asset. Detection of the hostile satellites and other space objects is similar to detecting debris since the hostile satellites and the other space objects propagate plasma waves.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. An outer space-based debris detection system comprising:

a first satellite configured to propagate first solitary plasma waves through an outer space detection area having a debris body therein, the debris body propagating second plasma waves therefrom; and a second satellite associated with the detection area and configured to receive the first solitary plasma waves from the first satellite after interaction with the second plasma waves from the debris body to thereby detect the debris body.

2. The outer space-based debris detection system of claim 1 wherein the first satellite comprises a voltage generator and a plasma perturbation tip coupled thereto.

3. The outer space-based debris detection system of claim 1 wherein the first satellite comprises a plasma perturbation tip.

4. The outer space-based debris detection system of claim 1 wherein the second plasma waves comprise a series of solitary plasma waves; and wherein the second satellite is configured to detect the debris body based on determining a phase shift in the first series of solitary plasma waves after interaction with the second series of solitary plasma waves.

5. The outer space-based debris detection system of claim 1 wherein the second plasma waves comprises plasma perturbations; and wherein the second satellite is configured to detect the debris body based on determining an amplitude change in the first series of solitary plasma waves after interaction with the second plasma perturbations.

6. The outer space-based debris detection system of claim 1 wherein the first satellite comprises an array of plasma perturbation tips.

7. The outer space-based debris detection system of claim 6 wherein the array of plasma perturbation tips have different sizes.

8. The outer space-based debris detection system of claim 1 wherein the second satellite comprises a Langmuir probe array.

9. The outer space-based debris detection system of claim 1 wherein the first and second satellites each comprises a communications system configured to use a timing reference to synchronize timing therebetween.

10. An outer space-based debris detection system comprising:
   a first satellite comprising an array of plasma perturbation tips configured to propagate respective first series of solitary plasma waves through an outer space detection area having a debris body therein, the debris body propagating second plasma waves therefrom; and
   a second satellite associated with the detection area and comprising a Langmuir probe array configured to receive the respective first series of solitary plasma waves from the first satellite after interaction with the second plasma waves from the debris body to thereby detect the debris body.

11. The outer space-based debris detection system of claim 10 wherein the second plasma waves comprise a series of solitary plasma waves; and wherein the second satellite is configured to detect the debris body based on determining a phase shift in the respective first series of solitary plasma waves after interaction with the second series of solitary plasma waves.

12. The outer space-based debris detection system of claim 10 wherein the second plasma waves comprise plasma perturbations; and wherein the second satellite is configured to detect the debris body based on determining an amplitude change in the respective first series of solitary plasma waves after interaction with the second plasma perturbations.

13. The outer space-based debris detection system of claim 10 wherein at least two of the plasma perturbation tips in the array have different sizes.

14. The outer space-based debris detection system of claim 10 wherein the first satellite comprises one of a probe and a tether to carry the array of plasma perturbation tips.

15. The outer space-based debris detection system of claim 10 wherein the debris body comprises one of a pinned soliton debris body, a precursor soliton debris body, and a plasma perturbation debris body.

16. A method for detecting debris in outer space comprising:
   operating a first satellite configured to propagate a first series of solitary plasma waves through an outer space detection area having a debris body therein, the debris body propagating second plasma waves therefrom; and
   operating a second satellite associated with the detection area and configured to receive the first series of solitary plasma waves from the first satellite after interaction with the second plasma waves from the debris body to thereby detect the debris body.

17. The method of claim 16 wherein the first satellite actively generates the first series of solitary plasma waves.

18. The method of claim 16 wherein the first satellite passively generates the first series of solitary plasma waves.

19. The method of claim 16 wherein the second plasma waves comprise a series of solitary plasma waves; and wherein detecting the debris body is based on determining a phase shift in the first series of solitary plasma waves after interaction with the second series of solitary plasma waves.

20. The method of claim 16 wherein the second plasma waves comprise plasma perturbations; and wherein detecting the debris body is based on determining an amplitude change in the first series of solitary plasma waves after interaction with the second plasma perturbations.

21. An outer space-based debris detection system comprising:
   a first satellite configured to propagate first solitary plasma waves through an outer space detection area having a debris body therein, the debris body propagating second plasma waves therefrom and comprising one of a pinned soliton debris body, a precursor soliton debris body, and a plasma perturbation debris body; and
   a second satellite associated with the detection area and configured to receive the first solitary plasma waves from the first satellite after interaction with the second plasma waves from the debris body to thereby detect the debris body.

22. The outer space-based debris detection system of claim 21 wherein the first satellite comprises a voltage generator and a plasma perturbation tip coupled thereto.

23. The outer space-based debris detection system of claim 21 wherein the first satellite comprises a plasma perturbation tip.

24. An outer space-based debris detection system comprising:
   a first satellite configured to propagate first solitary plasma waves through an outer space detection area having a debris body therein, the debris body propagating second plasma waves therefrom; and
   a second satellite associated with the detection area and configured to receive the first solitary plasma waves from the first satellite after interaction with the second plasma waves from the debris body to thereby detect the debris body, the second satellite comprising a communications system configured to communicate data on the detected debris body.

25. The outer space-based debris detection system of claim 24 wherein the first satellite comprises a voltage generator and a plasma perturbation tip coupled thereto.

26. The outer space-based debris detection system of claim 24 wherein the first satellite comprises a plasma perturbation tip.

* * * * *